United States Patent
Meynard et al.

(10) Patent No.: US 6,262,904 B1
(45) Date of Patent: Jul. 17, 2001

(54) METHOD AND DEVICE FOR CONTROLLING A STATIC CONVERTER POWERING AN ELECTRICAL SOURCE

(75) Inventors: Thierry Meynard, Toulouse; Xavier Roboam, Colomiers, both of (FR); Carlos de Almeida Martins, Porto (PT)

(73) Assignee: Centre National de la Recherche Scientifique (C.N.R.S.), Paris (FR)

( * ) Notice: Subject to any disclaimer, the term of this patent is extended or adjusted under 35 U.S.C. 154(b) by 0 days.

(21) Appl. No.: 09/647,990

(22) PCT Filed: Mar. 19, 1999

(86) PCT No.: PCT/FR99/00648

§ 371 Date: Oct. 10, 2000

§ 102(e) Date: Oct. 10, 2000

(87) PCT Pub. No.: WO99/53607

PCT Pub. Date: Oct. 21, 1999

(30) Foreign Application Priority Data

Apr. 9, 1998 (FR) .................................................. 98/04445

(51) Int. Cl.$^7$ ................................................. H02M 3/24
(52) U.S. Cl. ............................................ 363/95; 323/207
(58) Field of Search ................................. 363/78, 79, 95, 363/97; 323/207

(56) References Cited

U.S. PATENT DOCUMENTS

| | | | |
|---|---|---|---|
| 3,582,755 | * 6/1971 | Liss et al. | 363/78 |
| 3,914,670 | * 10/1975 | Holtz | 104/292 |
| 4,476,417 | * 10/1984 | Zimmermann | 388/821 |
| 4,800,481 | * 1/1989 | Knaffl et al. | 363/70 |
| 4,873,619 | * 10/1989 | Neupauer | 363/51 |
| 4,956,762 | * 9/1990 | Loveness et al. | 363/65 |
| 5,041,959 | * 8/1991 | Walker | 363/79 |

FOREIGN PATENT DOCUMENTS 0 274 302   8/1997 (FR) .

OTHER PUBLICATIONS

Nash J.N., "Direct Torque Control Induction Motor Vector Control Without an Encoder", vol. 33, No. 2, Mar. 1997, pp. 333–341, XP–000724904, *IEEE Transactions on Industry Applications*.

Chapius, Y. A. et al., "Commande Directe Du Couple D'une Machine Asynchrone Par Le Controledirect De Son Flux Statorique Direct Torque Control", vol. 5, No. 6, Jun. 1, 1995, pp. 863–880, XP000533453, *Journal De Physique III*.

\* cited by examiner

*Primary Examiner*—Adolf Deneke Berhane
(74) *Attorney, Agent, or Firm*—Young & Thompson

(57) ABSTRACT

The invention concerns a method for controlling a static converter (1) associated with a polyphased electrical source (2) which consists in generating synchronizing times t(i) defined by a periodic clock T; measuring at least a value representing the state of the electrical source; computing from the measured values at least a control value $\dot{c}(t)$ and its derivative c(t), and the value cp (t(i)+T) which each control value would have at the following synchronizing time t(i)+T, for the static converter configuration at time t(i); comparing each control value cp (t(i)+T) to a set value; determining said static converter configuration enabling to minimize the difference between each control value and the set value corresponding to the following synchronizing time t(i)+T; computing the derivative at time t(i)+T of a privileged control value, corresponding to the configuration Cc(t(i)+T) at time t(i)+T; determining the switching time t(i)+tcom between these times t(i) and t(i)+T enabling to minimize the difference at time t(i)+T between the privileged control value and the corresponding set value; and in controlling the static converter switching at time t(i)+tcom.

10 Claims, 7 Drawing Sheets

Figure 1:
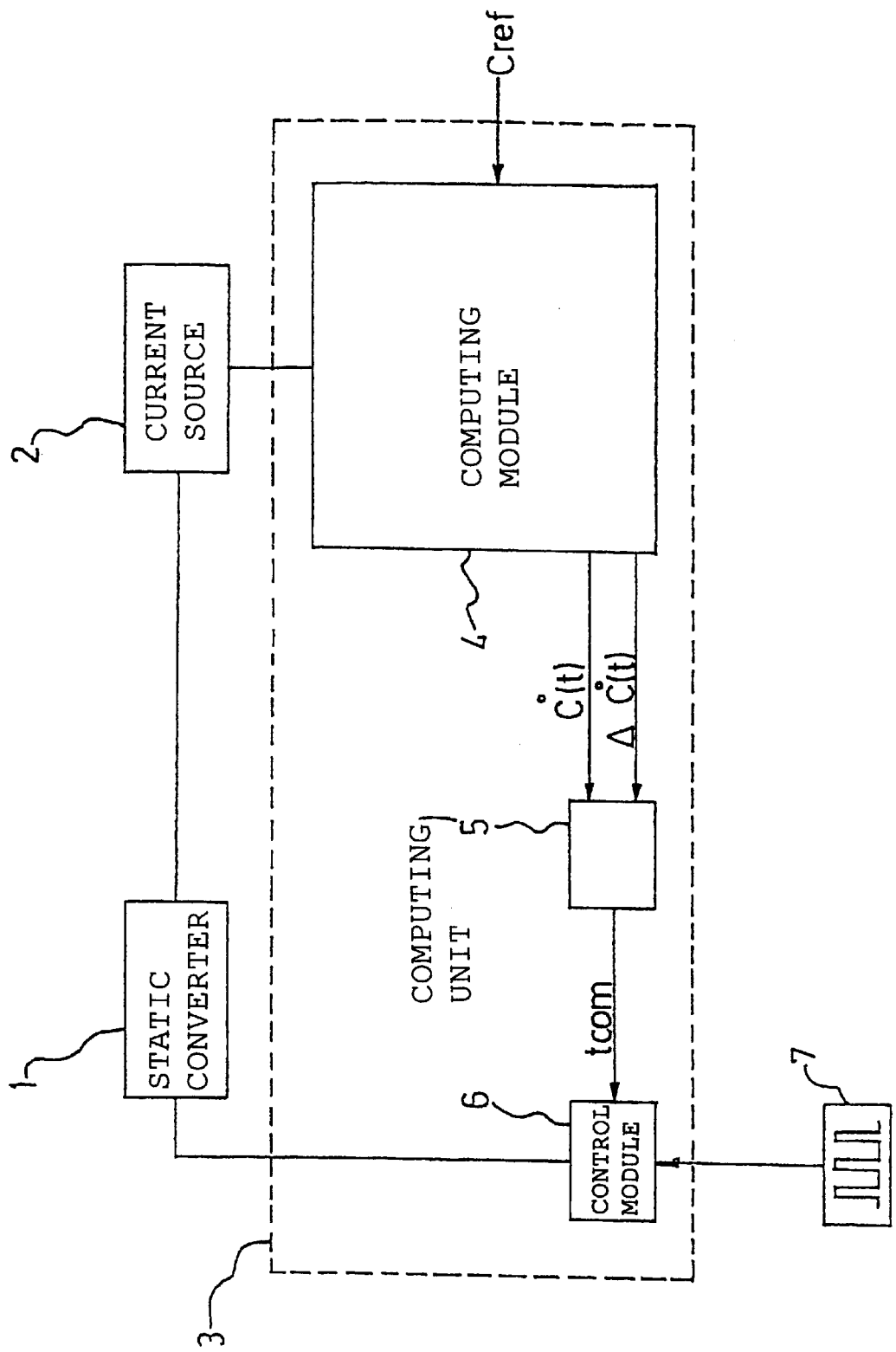

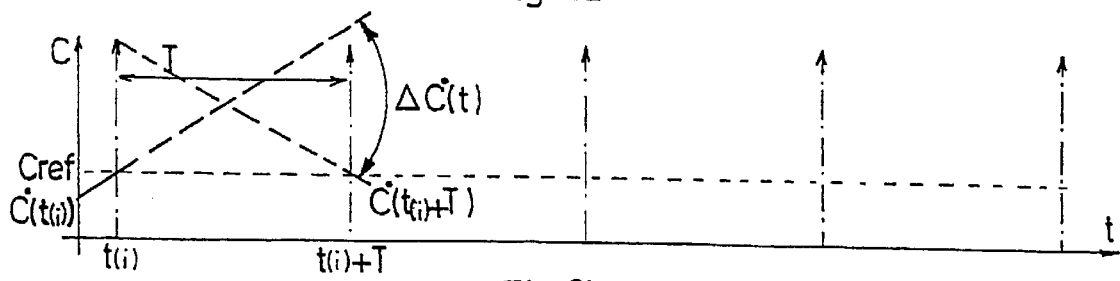
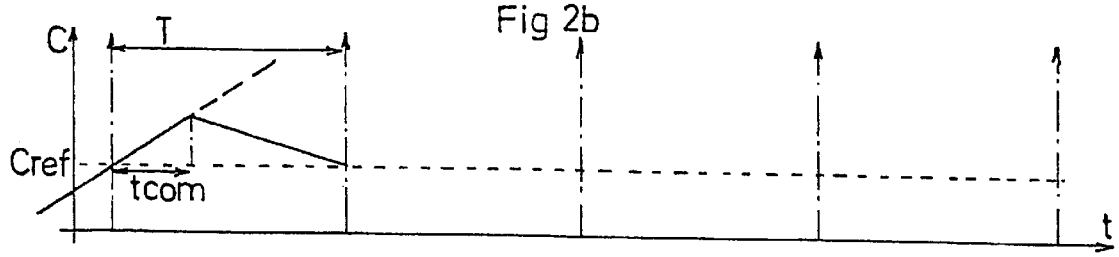
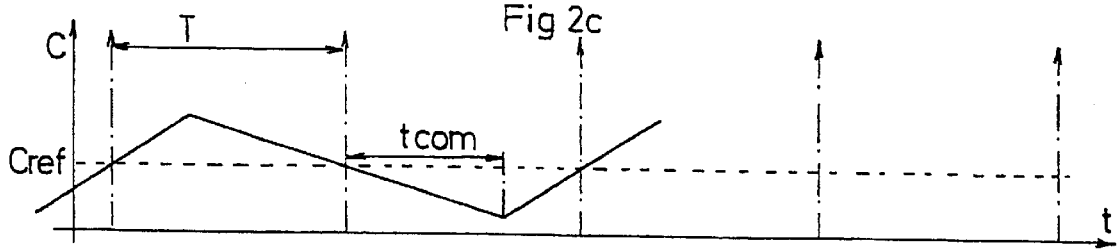
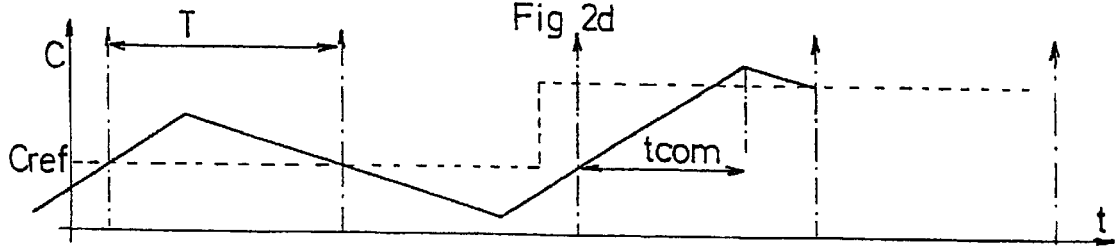
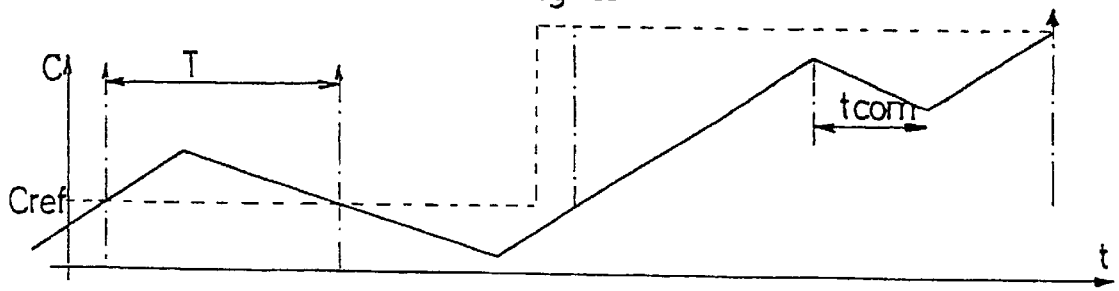

| sign ($\Delta C'_{em}$) | + | − | + | − |
|---|---|---|---|---|
| sign ($\Delta \phi'_s$) | + | + | − | − |
| θ(1) | P2 | P6 | P3 | P5 |
| θ(2) | P3 | P1 | P4 | P6 |
| θ(3) | P4 | P2 | P5 | P1 |
| θ(4) | P5 | P3 | P6 | P2 |
| θ(5) | P6 | P4 | P1 | P3 |
| θ(6) | P1 | P5 | P2 | P4 |

METHOD AND DEVICE FOR CONTROLLING A STATIC CONVERTER POWERING AN ELECTRICAL SOURCE

The invention concerns a method and a device for controlling a static converter designed to make it possible to adjust an electrical, and/or magnetic and/or mechanical control value of a current source supplied by this static converter.

Right from the start, one of the principal applications for static converters of electrical power has been the supply of variable frequency electrical machines, making it possible in this way to obtain good performances on systems for regulating velocity and position.

The triphase voltage inverter is a static converter particularly dedicated to the supply of alternating current machines for systems which demand good drive quality (precision, linearity, transient response, stability) in a wide range of variation of speed and load regime.

Traditionally, the structure of the voltage inverter used is composed of a single switching cell per phase, delivering an output voltage with a degree of harmonic distortion of which the limits are known. However, this inverter, a so-called two-level inverter, comes up against technological limits associated with its operating principle.

A new structure for a voltage inverter has been developed, making it possible to modulate the amplitude of the pulses. This multicellular structure, with interleaving cells, has a modular character, permitting a notable improvement in the quality of the voltage delivered which increases with the number of cells.

These multi-level series inverters may be considered as high-powered numerical/analogue converters.

In addition, present numerical signal processors are sufficiently rapid and precise for direct torque control (DTC) of the alternating current machine to be used. This control strategy consists of acting directly on the state of the inverter, from data on the instantaneous values of the torque and flux of the machine.

This control strategy rapidly has appeared as a major innovation making it possible to improve very appreciably the response time of the control of the torque of alternating current machines. Moreover, the basic principle remains very simple since it consists of "directly" choosing the inverter configuration as a function of the sign of the error of the torque and of the sign of the error of the flux which does not, in particular, require the presence of a speed or position sensor.

However, the performances, which are exceptional by certain aspects of this strategy, have not been sufficient to ignore the defects associated with the variable frequency operation which it imposes an increase in losses by switching or by hysteresis and the putting in danger of semiconductors during high-frequency operations,
acoustic disturbances during low frequency operations,
excitation of mechanical and/or electrical resonances due to scanning of the frequency.

The object of the present invention is to overcome these disadvantages and its principal object is to provide a method and a device for controlling a static converter preserving the dynamics of direct control methods such as described above, while leading to a choice of switching frequency as an independent parameter.

To this end, the object of the invention is first of all a method for controlling a static converter associated with a polyphase current source and a direct voltage source, the said method being designed to make it possible to adjust an electrical and/or magnetic and/or mechanical value of the current source, a so-called control value, wherein:

synchronization instants $t(i)$ are generated, defined by a periodic clock T, at least one electrical, magnetic or mechanical value is measured, representative of the state of the current source, at least one control value $c(t)$ and its derivative $\dot{c}(t)$ are calculated from the measured values, and the value $cp(t(i)+T)$ which each control value would have at the following synchronization instant $t(i)+T$, for the configuration Cc of the static converter at the instant $t(i)$, each control value $cp(t(i)+T)$ is compared with a preselected reference value, a so-called set value and, as a function of the result from the comparison and the configuration of the static converter at each synchronization instant $t(i)$, the configuration of the said static converter is determined which is able to minimize the difference between the control value and the corresponding set value at the following synchronization instant $t(i)+T$, the derivative at the instant $t(i)+T$ is calculated of a control value, a so-called preferred value, corresponding to the configuration $Cc(t(i)+T)$ at the instant $t(i)+T$, the switching instant $t(i)+t\text{com}$ is determined between these instants $t(i)$ and $t(i)+T$ making it possible to minimize the difference at the instant $t(i)+T$ between the preferred control value and the corresponding set value, and switching of the static converter is controlled at the instant $t(i)+t\text{com}$.

According to the invention, the control principle is divided into three steps:

choice of the configuration of the static converter at an instant $t(i)+T$ as a function of the configuration of this converter at an instant $t(i)$ and measured values representing the state of the current source, computation of the switching instant $t(i)+t\text{com}$ between the present and future configurations, for a preferred control value of which it is desired to control the switching frequency, control of the switching of the static converter at the instant $t(i)+t\text{com}$.

This control method accordingly leads to:

controlling a single switching of the static converter between two sampling instants $t(i)$, $t(i)+T$, fixing, between these two instants, and by means of computing derivatives, the switching instant so as to minimize the difference between the preferred control value and the corresponding preselected set value.

Such a control method thus makes it possible to assign the control value(s) delivered by the current source in a highly dynamic way, while selecting the switching frequency of the static converter as an independent parameter and while no longer treating it as a consequence of the operating conditions.

According to the application, it will then be possible to choose to assign a fixed frequency (for example in order to enable electrical or mechanical filtering to take place with the aid of a very selective band eliminator circuit) or to vary the cut-off frequency according to the load conditions, (for example to keep the temperature of semiconductors constant and to reduce thermal cycling).

According to a first application designed to control an N-level inverter, with $N \geq 2$, associated with a triphase asynchronous machine, the stator flux $\phi s$ and the electromagnetic torque Cem of the said machine are preferably selected as the control value, and the electromagnetic torque Cem as the preferred control value.

In addition, and advantageously, with a view to calculating the control values φs and Cem, measurements are taken of the line currents I1, I2, I3 and the estimated or measured stator voltages V1, V2, V3 at the output from the inverter.

In addition, according to this application, the derivatives φs and Cem of the control values φs and Cem are preferably calculated from the following formulae:

$$\dot{\phi}s = \frac{d\phi s}{dt} = \frac{2}{3\phi s}(\phi_{s\alpha}V_{s\alpha} + \phi_{s\beta}V_{s\beta} - Rs(\phi_{s\alpha}I_{s\alpha} + \phi_{s\beta}I_{s\beta})) \quad \text{and}$$

$$\dot{C}em = \frac{dCem}{dt} = P(V_{s\alpha}K_{s\beta} - V_{s\beta}K_{s\alpha} - k1)$$

with:

$$K_{s\alpha} = I_{s\alpha} - \frac{\phi_{s\alpha}}{\sigma Ls}; \quad K_{s\beta} = I_{s\beta} - \frac{\phi_{s\beta}}{\sigma Ls}$$

$$k1 = \frac{Rs'}{\sigma LsP}Cem + \frac{3\omega}{2\sigma Ls}\phi s^2 - \omega(\phi_{s\alpha}I_{s\alpha} + \phi_{s\beta}I_{s\beta})$$

$$Rs' = Rs + \frac{Ls}{Lr}Rr$$

In all the above formulae:

Rs=the stator resistance
Rr=the rotor resistance
P=the number of pairs of poles
σ=dispersion coefficient
Ls and Lr=the cyclic stator and rotor inductances
ω=the electrical rate of rotation of the machine 2.

In addition and advantageously, a computation is made of the variation of the derivative of the torque ΔĊem between the configurations of the inverter 1 at the instant t(i) and t(i)+T according to the following equation:

$$\Delta\dot{C}em = \frac{P}{\sigma Ls}((\sigma LsI_{s\beta} - \phi_{s\beta})\Delta V_{s\alpha} - (\sigma LsI_{s\alpha} - \phi_{s\alpha})\Delta V_{s\beta})$$

where $\Delta V_{s\alpha}$ and $\Delta V_{s\beta}$ correspond to variations in the stator voltages between the instants t(i) and t(i)+T.

the switching instant t(i)+tcom between t(i) and t(i)+T, of the inverter according to the formula:

$$tcom = -\frac{(Cem)ref - Cem}{\Delta\dot{C}em} + T\frac{\dot{C}em + \Delta\dot{C}em}{\Delta\dot{C}em}$$

In addition, according to one preferred embodiment involving this first application:
a computation is made, from the configuration of the inverter 1 at an instant t(i) corresponding to a localization Qi of the output voltage in a phase plane αβ divided into six angular sectors θ1 . . . θ6, of the slopes of the control values from the derivatives φ̇s and Ċem,
the value of these slopes is deduced if the latter have to be increased or reduced so as to minimize the difference between each control value and the corresponding reference value at the instant t(i)+T,
and the point PK=Qi+1 is determined corresponding to the configuration of the inverter at the instant t(i)+T by means of the following truth table:

| Sign (ΔĊem) | + | − | + | − |
|---|---|---|---|---|
| Sign (Δφ̇s) | + | + | − | − |
| θ (1) | P2 | P6 | P3 | P5 |
| θ (2) | P3 | P1 | P4 | P6 |
| θ (3) | P4 | P2 | P5 | P1 |
| θ (4) | P5 | P3 | P6 | P2 |
| θ (5) | P6 | P4 | P1 | P3 |
| θ (6) | P1 | P5 | P2 | P4 |

According to a second application for controlling an interrupter (k) such as in particular a transistor, associated with a load RL such as in particular a two-level chopper, and at each sampling instant t(i):
the derivatives are calculated of the value I to be controlled at the instants t(i) and t(i)+T according to the state of the interrupter (k) at the instant t(i) according to the following formulae:
if the interrupter (k) is conducting at the instant t(i):

$$\dot{I}(t(i)) = \frac{E - V}{L} \quad \text{and} \quad \dot{I}(t(i) + T) = -\frac{V}{L}$$

if the interruptor (k) is non-conducting at the instant t(i):

$$\dot{I}(t(i)) = \frac{-V}{L} \quad \text{and} \quad \dot{I}(t(i) + T) = \frac{E - V}{L}$$

and a determination is made of the switching instant t(i)+tcom between t(i) and t(i)+T for changing the state of the interrupter (k) according to the formulae:
if the switch (k) is conducting at the instant t(i):

$$tcom = \frac{Iref - I(t(i))}{E/L} + T\frac{V}{E}$$

if the switch (k) is non-conducting at the instant t(i):

$$tcom = -\frac{Iref - I(t(i))}{E/L} + T\frac{E - V}{E}$$

The invention extends to a control device comprising:
a periodic clock T capable of generating synchronization times t(i),
a computing module capable of computing, at each instant t(i):
  from at least one measured value representing the state of the current source, at least one control value c(t) and its derivative ċ(t),
  from each control value c(t) and its derivative ċ(t), and by comparison with a preselected reference value, the configuration of the static converter capable of leading to the minimization of the difference at the instant t(i)+T between each control value and the corresponding reference value,
  the variation of the derivative of one of the control values, the so-called preferred value, between the configurations of the static converter at the instants t(i) and t(i)+T respectively,
a unit for computing the switching instant t(i)+tcom between t(i) and t(i)+T able to minimize the difference at the instant t(i)+T between the preferred control value and the associated reference value, and a unit for controlling the switching of the static converter at the instant t(i)+tcom.

Figure 3:
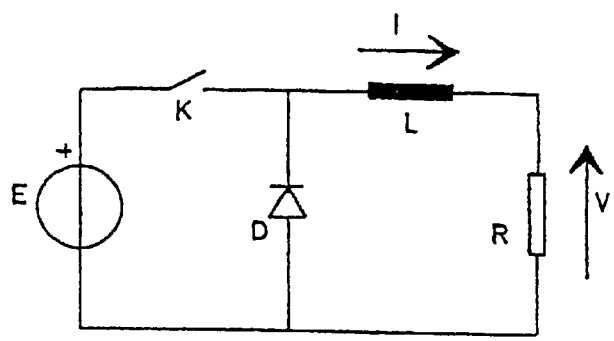
Figure 4:
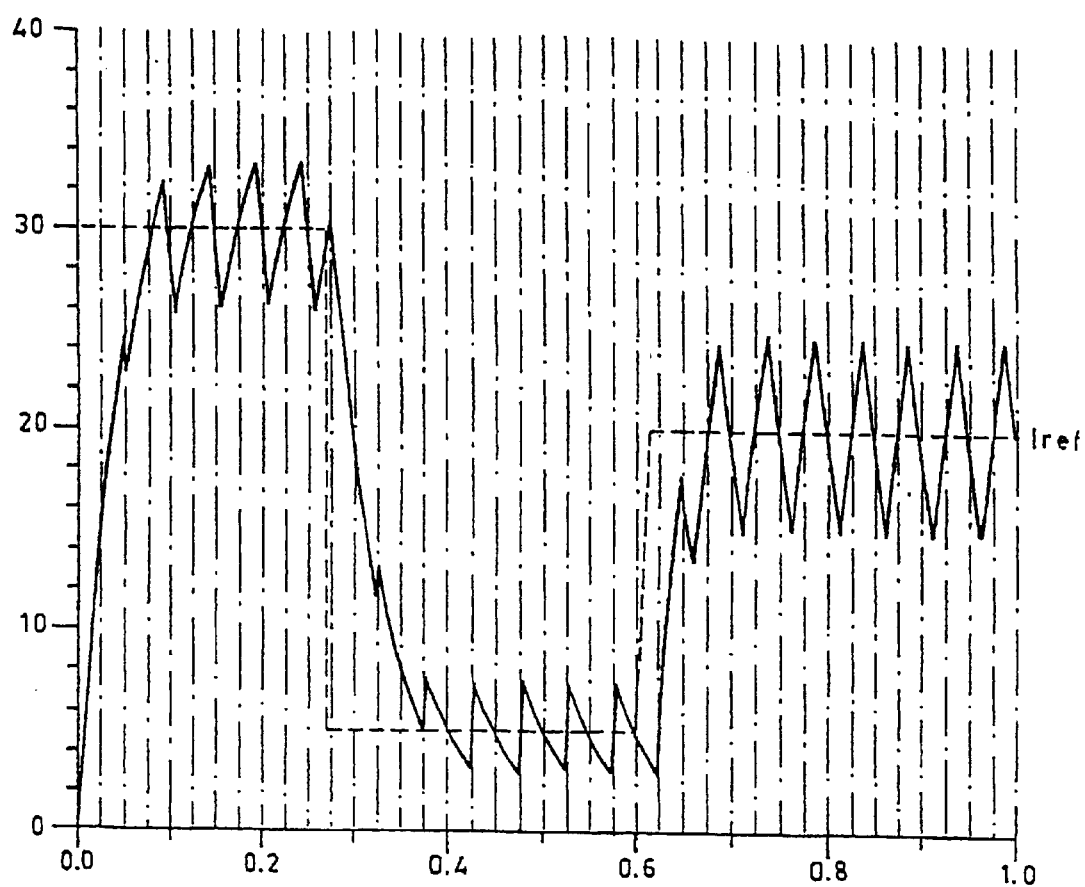
Figure 5:
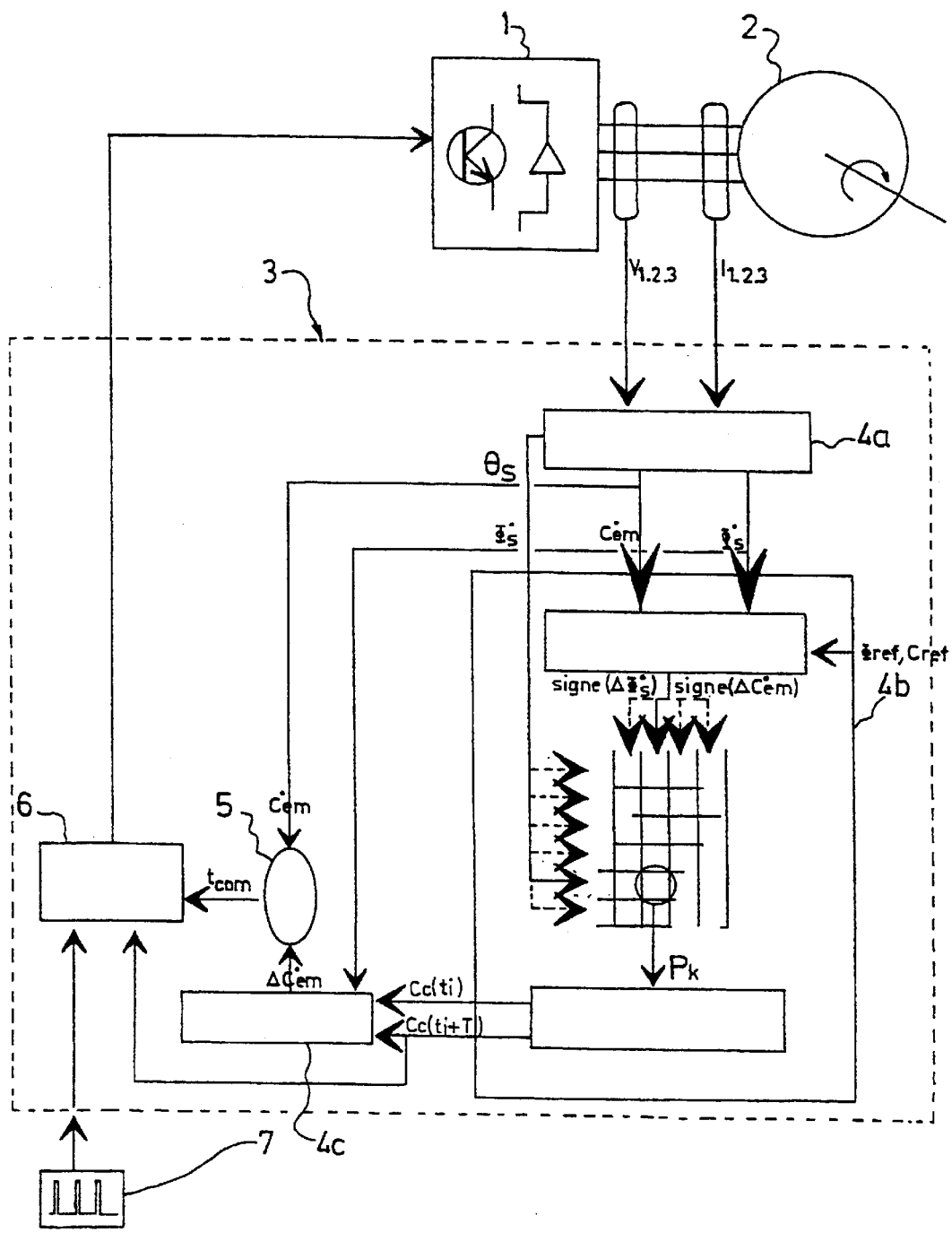
Figure 6:
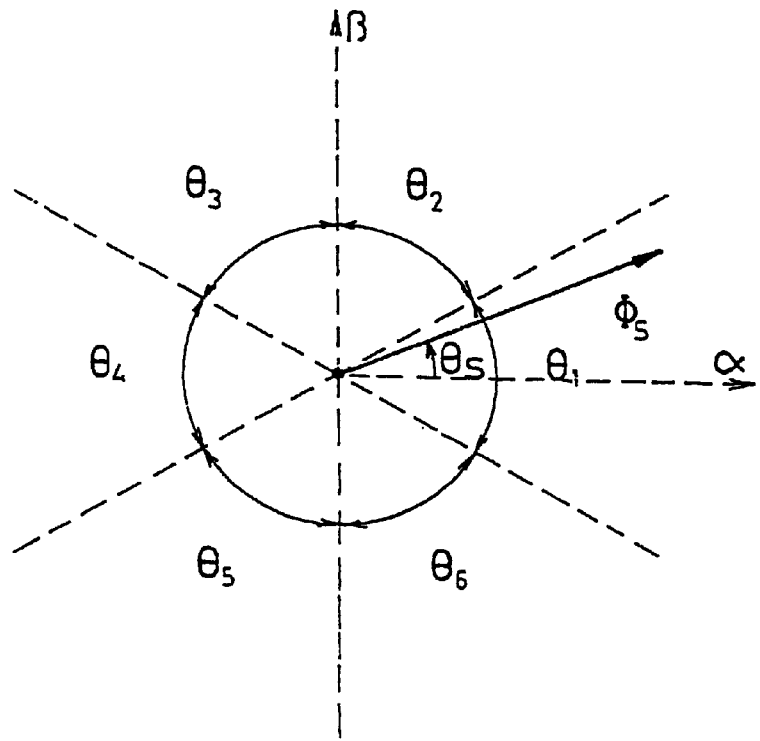
Figure 7A:
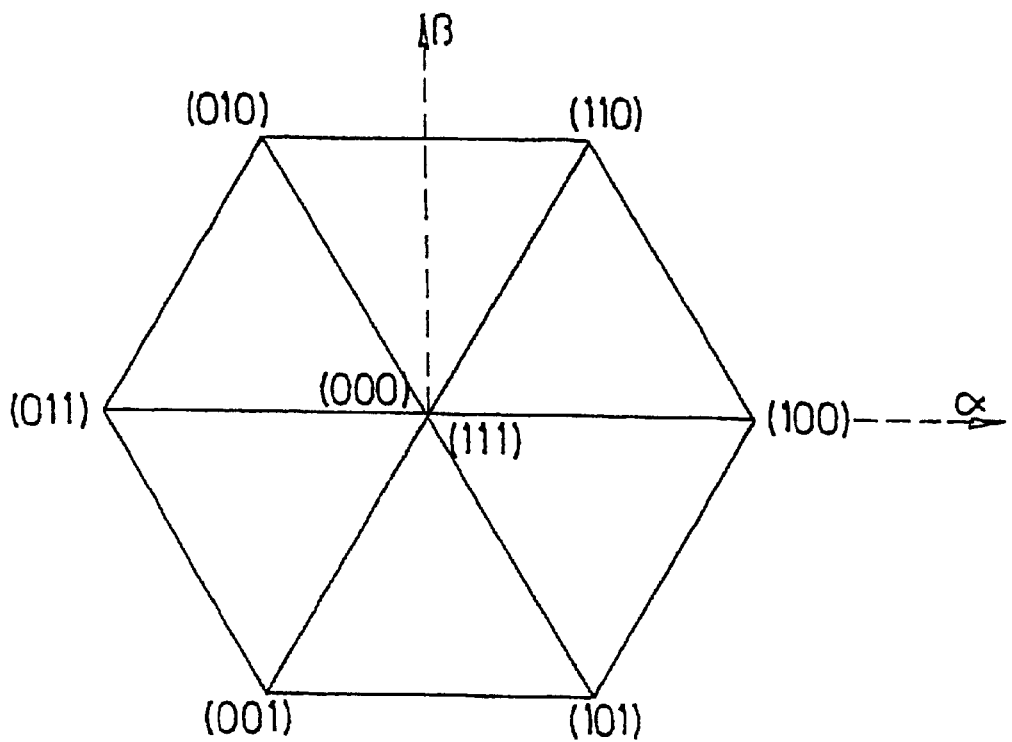
Figures 7B, 8:
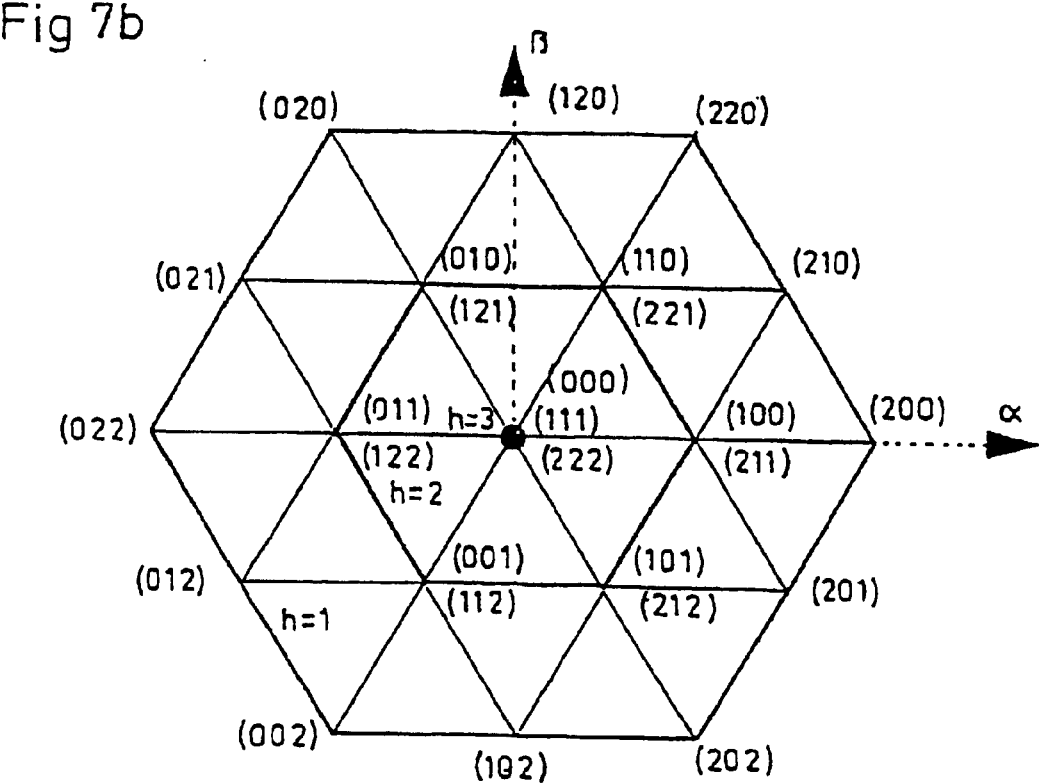
Figure 9:
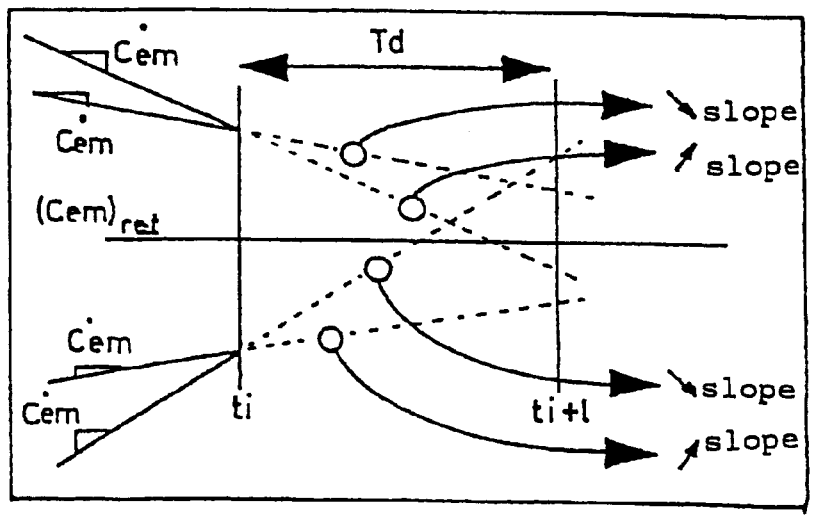
Figure 10:
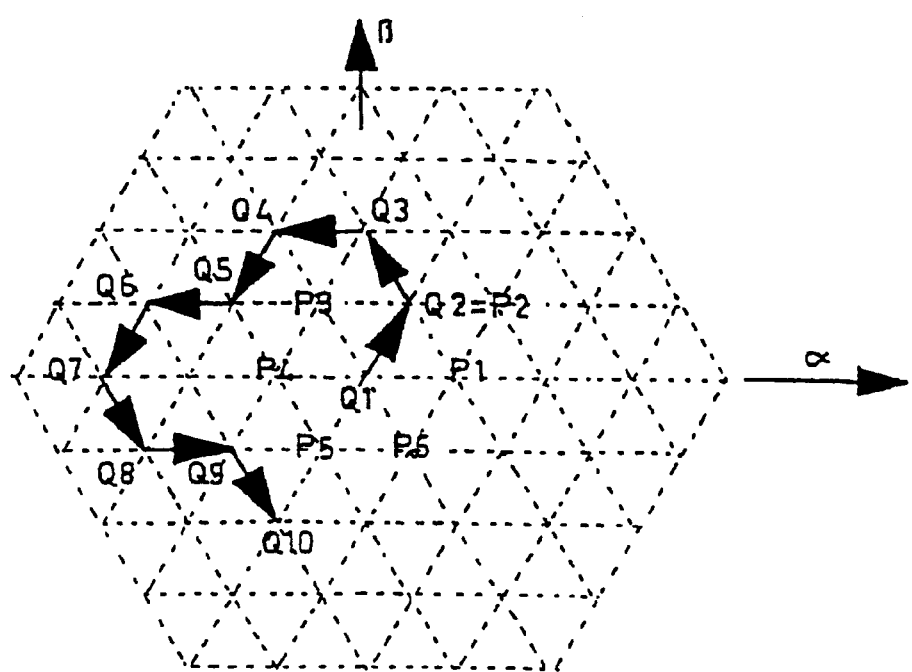

Other characteristics, objects and advantages of the invention will become apparent from the following detailed description with reference to the accompanying drawings, which represent as a non-limiting example, a device according to the invention with general application, and two preferred types of applications of the method according to the invention. On these drawings, which form an integral part of the present invention:

FIG. 1 is a general overall view of a device according to the invention applied to the control of a current source, FIGS. 2a to 2e are graphical representations illustrating the control principle used according to the method of the invention, FIG. 3 is a circuit diagram representing a two-level chopper, delivering on load (R,L), FIG. 4 is a graph representing the response of the current obtained at the output from the chopper in accordance with the control method according to the invention, FIG. 5 is an overall diagram of a device according to the invention applied to the control of a triphase asynchronous machine, FIG. 6 is a representation of the angular sectors for locating the position of the flux of this asynchronous machine, FIGS. 7a and 7b are representations of voltage vectors which can be attained respectively by a two-level triphase inverter and a three-level triphase inverter, FIG. 8 is a selection table for the generation of control signals, FIG. 9 is a diagram illustrating the selection strategy necessary for using the selection table of FIG. 8, and FIG. 10 is a graphical representation of an example of the trajectory of the voltage vector during a transitory regime.

The device according to the invention, of which the block diagram is represented in a general manner in FIG. 1, is designed so as to make it possible to adjust a control value of a current source 2 supplied by a static converter 1, all with a high dynamic response and assigning the switching frequency of the said static converter. To this end, the device comprises a control unit 3 including, first of all, a computing module 4 programmed to:

compute from at least one measured value representative of the state of the current source 2:
  a control value c(t) and its derivative ċ(t) at the sampling instant t(i),
  the slope ċ(t(i)+T) of this control value c(t) at the instant t(i)+T making it possible to minimize the difference between the latter and a predetermined reference value cref, deliver two signals, each representing values of ċ(t(i)) and Δċ(t(i))=ċ(t(i)+T)−ċ(t(i)).

This control unit 3 additionally includes a unit 5 for computing the instant t(i)+tcom between t(i) and t(i)+T making it possible to obtain or to approach the reference value cref at the instant t(i)+T.

This control unit 3 finally includes a control module 6 adapted so as to assign the new following configuration of the static converter 1 at the instant t(i)+tcom, controlled by a pulse generator 7 determining the operating frequency.

The operating principle of this device is illustrated in FIGS. 2a to 2e, and thus consists of dividing the time into equal cut-off intervals of duration T and of carrying out at most one switching of the static converter 1 during each period.

Such a device may, by way of example and first of all, be applied to the control of the output current from a standard chopper such as represented in FIG. 3.

To this end, according to the principle as described above, an output current is assigned equal to a reference current at each sampling instant with, in addition, a single switching of the chopper between two sampling instants.

At each sampling instant t(i), the instant t(i)+tcom is thus computed where the following switching will take place so as to obtain, at instant t(i)+T, a current equal to the reference current. This results in:

$$I(t(i)) + \dot{I}(t(i)) \cdot tcom + \dot{I}(t(i)+T) \cdot (T-tcom) = Iref$$

which gives $$tcom = \frac{Iref - I(t(i))}{\dot{I}(t(i)) - \dot{I}(t(i)+T)} - T\frac{\dot{I}(t(i)+T)}{\dot{I}(t(i)) - \dot{I}(t(i)+T)}$$

This control mode thus makes it necessary to compute derivatives of the value to be controlled, and to distinguish two cases:

1° if the transistor K is conducting at the sampling instant:

$$\dot{I}(t(i)) = \frac{E-V}{L} \quad \text{and} \quad \dot{I}(t(i)+T) = -\frac{V}{L}$$

and consequently, it will be non-conducting at:

$$tcom = \frac{Iref - I(t(i))}{E/L} + T\frac{V}{E}$$

2°) if the transistor is non-conducting at the sampling instant:

$$\dot{I}(t(i)) = \frac{-V}{L} \quad \text{and} \quad \dot{I}(t(i)+T) = \frac{E-V}{L}$$

and consequently, it will be started at:

$$tcom = -\frac{Iref - I(t(i))}{E/L} + T\frac{E-V}{E}$$

The result of this control is illustrated in FIG. 4 representing the output current from the chopper which, for a given value Iref oscillates about this value and in a continuous regime becomes equal to the latter at each sampling instant.

As regards the device according to the invention represented in FIG. 5, this is adapted so as to control directly the torque of an asynchronous machine 2 supplied by a static converter 1. This device makes it possible to assign the torque delivered by the machine 2 with a high dynamic response, while assigning the switching frequency of the static converter 1.

According to this application, the computing module 4 of the control unit 3 principally includes:

a module 4a for estimating the value to be controlled of the torque and flux and their derivatives, a computing module 4b associated with a table shown in FIG. 8 making it possible to select the following configuration of the converter 1, a module 4c for predicting the variation of the derivative of the torque ΔCem between the present and following configurations.

This control unit 3 additionally includes:

the module 5 for computing the instant t(i)+tcom for passing from one inverter configuration Cc(t(i)) to the following configuration Cc(t(i)+T), and the module 6 designed to assign the inverter configuration Cc(t(i)+T) at the instant T(i)+tcom following the current clock spike delivered by the pulse generator 7.

According to this control device, the control principle is divided into three main steps:

determination, by means of the computing module 4a, of the future inverter configuration Cc(t(i)+T) from the present configuration Cc(t(i)) and the measurements taken, calculation, by means of the module 5, the switching instant t(i)+tcom between the present and future configurations for a preferred control value of which the switching frequency is to be controlled, in the event the torque Cem of the machine 2, assigning, by means of the module 6, the new configuration Cc(t(i)+T) at the desired instant.

Each of these steps is described below in a detailed manner by analyzing the functions of each module and modules 4a–4c, 5, 6.

The first module 4a is designed, from measurements of the line currents I1, I2, I3 and of the estimated or measured stator voltages V1, V2, V3 at the output from the inverter 1, for reconstituting, by the model of the asynchronous machine 2, the control values, i.e. the electromagnetic torque Cem and the stator flux ϕs as well as their derivatives.

These values of the flux and of the torque are obtained in a conventional manner by placing in a fixed reference value αβ associated with the stator of the machine 2, and by computing $I_{s\alpha}$, $I_{s\beta}$, $V_{s\alpha}$ and $V_{s\beta}$ by making triphase/diphase transformations at constant power on the axes αβ.

Computation of the stator flux may thus for example be obtained by using the stator equations of the machine 2 by means of the following equations:

$$\phi_{s\alpha} = \int_0^t (V_{s\alpha} - Rs I_{s\alpha}) dt$$

$$\phi_{s\beta} = \int_0^t (V_{s\beta} - Rs I_{s\beta}) dt$$

As regards the electromagnetic torque of the machine 2, this is computed from the values $\phi_{s\alpha}$ and $\phi_{s\beta}$ and from measurements of the in-line currents, using the following equation:

$$Cem = P(\phi_{s\alpha} I_{s\beta} - \phi_{s\beta} I_{s\alpha})$$

From these equations, the values of the derivatives of the flux and of the torque are obtained from the following formulae:

$$\dot\phi s = \frac{d\phi s}{dt} = \frac{2}{3\phi s}(\phi_{s\alpha} V_{s\alpha} + \phi_{s\beta} V_{s\beta} - Rs(\phi_{s\alpha} I_{s\alpha} + \phi_{s\beta} I_{s\beta}))$$

and $$\dot Cem = \frac{d\,Cem}{dt} = P(V_{s\alpha} K_{s\beta} - V_{s\beta} K_{s\alpha} - k1)$$

with:

$$K_{s\alpha} = I_{s\alpha} - \frac{\phi_{s\alpha}}{\sigma Ls}; \quad K_{s\beta} = I_{s\beta} - \frac{\phi_{s\beta}}{\sigma Ls}$$

$$k1 = \frac{Rs'}{\sigma Ls P} Cem + \frac{3\omega}{2\sigma Ls}\phi s^2 - \omega(\phi_{s\alpha} I_{s\alpha} + \phi_{s\beta} I_{s\beta})$$

$$Rs' = Rs + \frac{Ls}{Lr} Rr$$

In all the above formulae:
Rs=the stator resistance
Rr=the rotor resistance
P=the number of pairs of poles
σ=dispersion coefficient
Ls and Lr=the cyclic stator and rotor inductances
ω=Electrical rate of rotation of the machine 2.

Control of these values is achieved by the conventional Direct Torque Control technique ("DTC") which depends directly on the position of the stator flux in the phase plane αβ. As illustrated in FIG. 6, this plane αβ is divided into six angular sectors θ1 ... θ6. According to this division, the control values have a constant direction of change inside a given angular sector, for a chosen inverter configuration, and the voltage vectors which can be attained by the two-and three-level inverters are represented by way of examples in FIGS. 7a and 7b.

However, the configuration of the inverter 1 corresponds to the logic orders assigned at each switch, and the said inverter may have any number of switching cells in series (p=N–1). The output voltage vectors may thus in this way reach an assembly of points inscribed inside a hexagon represented in the phase plane, as illustrated in FIG. 10, which represents the trajectory of the voltage vector during a transitory regime.

As regards the computing module 4b, this is adapted so as to compute, from the control values at the instant (t(i)), these control values at the sampling instant (t(i)+T).

To this end, and first of all, this computing module 4b is adapted, from the configuration of the inverter 1 at an instant t(i) corresponding to a localization Qi of the output voltage in the phase plane, to calculate the slopes of the control values from the values $\dot\phi s$ and $\dot Cem$ delivered by the module 4a.

The value of these slopes makes it possible to predict whether the configuration at the instant t(i) leads the control values above or below the reference values.

Knowing that the objective is to obtain zero error between the control values and the reference values at the instant t(i)+T, the computing module 4b is then adapted so as to define whether these slopes should be increased (+) or reduced (–).

This selection, consisting of choosing an increase or reduction in slope of the torque, is illustrated in FIG. 9 on which the values of the reference torque (Cem)ref are represented as well as the various slopes $\dot Cem$ at instant t(i).

From this determination and from a knowledge of the angular sector θ(k) where the flux is situated, delivered by the module 4a, the computing module 4b is designed by means of a truth table shown in FIG. 8 to determine the point Qi+1=PK corresponding to the configuration of the inverter at the instant t(i)+T. As shown in FIG. 10, this point Qi+1 is one of six points of the peripheral hexagon at Qi.

As regards the module 4c, this is adapted so as to compute the variation of the derivative of the torque $\Delta \dot Cem$ between the configurations of the inverter 1 at the instant t(i) and t(i)+T. This calculation is carried out by means of the following equation:

$$\Delta \dot Cem = \frac{P}{\sigma Ls}((\sigma Ls I_{s\beta} - \phi_{s\beta})\Delta V_{s\alpha} - (\sigma Ls I_{s\alpha} - \phi_{s\alpha})\Delta V_{s\beta})$$

$\Delta V_{s\alpha}$ and $\Delta V_{s\beta}$ correspond to variations in the stator voltages from one configuration of the inverter at the instant t(i) to that at the instant t(i)+T.

Finally, computation of the switching instant t(i)+tcom of the inverter, carried out at the level of the module 5 is based on the following equation:

$$tcom = -\frac{(Cem)ref - Cem}{\Delta \dot{C}em} + T\frac{\dot{C}em + \Delta \dot{C}em}{\Delta \dot{C}em}$$

The main object of the control strategy described above is thus to assign the switching frequency while choosing it as an independent parameter and no longer treating it as a consequence of the operating conditions.

To this end, the time is divided into equal cut-off periods of duration T, and as represented in FIG. 10, it is ensured that during each period T there is a single shift from a point which can be attained by the inverter 1 to another neighbouring point.

For this, considering that, at a cut-off instant, the corresponding vector at the point Qi has been chosen in the preceding period, two questions need to be resolved:

1°) choice of the point PK from among the six points around Qi(P1 to P6) for which it is necessary to switch over and will constitute, at the following cut-off period, the point coinciding with the central point (Qi+1), 2°) determination of the instant T(i)+tcom within the interval [t(i), t(i)+T] at which the transition must be made from Qi to Qi+1=PK.

In order to resolve the first question, use is made of the table of FIG. 8, which gives us for each sector θ, the point PK capable of providing the signs of:

$$\Delta \dot{C}em = \dot{C}em(t(i)+T) - \dot{C}em(t(i)) \text{ and of } \dot{\phi}s = \dot{\phi}s(t(i)+T) - \dot{\phi}s(t(i)).$$

We should remember that the strategy for choosing the sign (Δ$\dot{C}$em) and similarly the sign (Δ$\dot{\phi}$s) necessary for using the table of FIG. 8 is represented in FIG. 9.

In order to resolve the second question, the switching instant t(i)+tcom is computed which will make it possible to obtain zero error for the torque with respect to a reference torque value Cemref at each cut-off instant.

Accordingly, the algorithm corresponding to this control law at a fixed frequency may be given in the following form. At each instant t(i), the following should be carried out:

1) calculate $$\dot{C}em = \frac{d Cem}{dt},$$

2) choose the point PK by using the table of FIG. 8,
3) calculate ΔCem corresponding to the passage Qi to PK,
4) calculate the switching instant t(i)+tcom.

What is claimed is:

1. A method for controlling a static converter (1) associated with a polyphase current source (2) and a direct voltage source, the said method being designed to make it possible to adjust an electrical and/or magnetic and/or mechanical value of the current source (2), a so-called control value, wherein:

synchronization instants t(i) are generated, defined by a periodic clock T, at least one electrical, magnetic or mechanical value is measured, representative of the state of the current source, at least one control value c(t) and its derivative $\dot{c}$(t) are calculated from the measured values, and the value cp(t(i)+T) which each control value would have at the following synchronization instant t(i)+T, for the configuration Cc of the static converter at the instant t(i), each control value cp(t(i)+T) is compared with a preselected reference value, a so-called set value and, as a function of the result from the comparison and the configuration of the static converter at each synchronization instant t(i), the configuration of the said static converter is determined which is able to minimize the difference between the control value and the corresponding set value at the following synchronization instant t(i)+T, the derivative at the instant t(i)+T is calculated of a control value, a so-called preferred value, corresponding to the configuration Cc(t(i)+T) at the instant t(i)+T, the switching instant t(i)+tcom is determined between these instants t(i) and t(i)+T making it possible to minimize the difference at the instant t(i)+T between the preferred control value and the corresponding set value, and switching of the static converter is controlled at the instant t(i)+tcom.

2. The method as claimed in claim 1, for controlling an N-level inverter (1), with N≧2, associated with a triphase asynchronous machine (2), wherein the stator flux φs and the electromagnetic torque Cem of the said machine are preferentially selected as the control value, and the electromagnetic torque Cem as the preferred control value.

3. The method as claimed in claim 2, wherein, with a view to calculating the control values φs and Cem, measurements are taken of the line currents I1, I2, I3 and the estimated or measured stator voltages V1, V2, V3 at the output from the inverter (1).

4. The method as claimed in claim 2, wherein the derivatives $\dot{\phi}$s and $\dot{C}$em of the control values φs and Cem are calculated from the following formulae:

$$\dot{\phi}s = \frac{d\phi s}{dt} = \frac{2}{3\phi s}(\phi_{s\alpha} V_{s\alpha} + \phi_{s\beta} V_{s\beta} - Rs(\phi_{s\alpha} I_{s\alpha} + \phi_{s\beta} I_{s\beta}))$$

and $$\dot{C}em = \frac{d\, Cem}{dt} = P(V_{s\alpha} K_{s\beta} - V_{s\beta} K_{s\alpha} - k1)$$

with:

$$K_{s\alpha} = I_{s\alpha} - \frac{\phi_{s\alpha}}{\sigma Ls}; K_{s\beta} = I_{s\beta} - \frac{\phi_{s\beta}}{\sigma Ls}$$

$$k1 = \frac{Rs'}{\sigma LsP}Cem + \frac{3\omega}{2\sigma Ls}\phi s^2 - \omega(\phi_{s\alpha} I_{s\alpha} + \phi_{s\beta} I_{s\beta})$$

$$Rs' = Rs + \frac{Ls}{Lr}Rr$$

In all the above formulae:

Rs=the stator resistance

Rr=the rotor resistance

P=the number of pairs of poles

σ=dispersion coefficient

Ls and Lr=the cyclic stator and rotor inductances

ω=the electrical rate of rotation of the machine 2.

5. The method as claimed in claim 4, wherein a computation is made:

of the variation of the derivative of the torque Δ$\dot{C}$em between the configurations of the inverter (1) at the instants t(i) and t(i)+T according to the following equation:

$$\dot{C}em = \frac{P}{\sigma Ls}((\sigma Ls I_{s\beta} - \phi_{s\beta})\Delta V_{s\alpha} - (\sigma Ls I_{s\alpha} - \phi_{s\alpha})\Delta V_{s\beta})$$

where $\Delta V_{s\alpha}$ and $\Delta V_{s\beta}$ correspond to variations in the stator voltages between the instants t(i) and t(i)+T, the switching instant t(i)+tcom between t(i) and t(i)+T, of the inverter (1) according to the formula:

$$tcom = -\frac{(Cem)ref - Cem}{\Delta \dot{C}em} + T\frac{\dot{C}em + \Delta \dot{C}em}{\Delta \dot{C}em}.$$

6. The method as claimed in claim 4, wherein:
a computation is made, from the configuration of the inverter (1) at an instant t(i) corresponding to a localization Qi of the output voltage in a phase plane αβ divided into six angular sectors θ1 ... θ6, of the slopes of the control values from the derivatives $\dot{\phi}s$ and $\dot{C}em$, the value of these slopes is deduced if the latter have to be increased or reduced so as to minimize the difference between each control value and the corresponding reference value at the instant t(i)+T,
and the point PK=Qi+1 is determined corresponding to the configuration of the inverter (1) at the instant t(i)+T by means of the following truth table:

| Sign ($\Delta\dot{C}$em) | + | − | + | − |
|---|---|---|---|---|
| Sign ($\Delta\dot{\phi}$s) | + | + | − | − |
| θ (1) | P2 | P6 | P3 | P5 |
| θ (2) | P3 | P1 | P4 | P6 |
| θ (3) | P4 | P2 | P5 | P1 |
| θ (4) | P5 | P3 | P6 | P2 |
| θ (5) | P6 | P4 | P1 | P3 |
| θ (6) | P1 | P5 | P2 | P4. |

7. The method as claimed in claim 1 for controlling a switch (k) such as in particular a transistor, associated with a load RL such as in particular a two-level chopper, wherein at each sampling instant t(i):
the derivatives are calculated of the value I to be controlled at the instants t(i) and t(i)+T according to the state of the switch (k) at the instant t(i) according to the following formulae:
if the switch (k) is conducting at the instant t(i):

$$\dot{I}(t(i)) = \frac{E-V}{L} \text{ and } \dot{I}(t(i)+T) = -\frac{V}{L}$$

if the switch (k) is non-conducting at the instant t(i):

$$\dot{I}(t(i)) = \frac{-V}{L} \text{ and } \dot{I}(t(i)+T) = \frac{E-V}{L}$$

and a determination is made of the switching instant t(i)+tcom between t(i) and t(i)+T for changing the state of the switch (k) according to the formulae:
if the switch (k) is conducting at the instant t(i):

$$tcom = \frac{Iref - I(t(i))}{E/L} + T\frac{V}{E}$$

if the switch (k) is non-conducting at the instant $$tcom = -\frac{Iref - I(t(i))}{E/L} + T\frac{E-V}{E}.$$

8. Device for controlling a static converter (1) associated with a polyphase current source (2) and a direct voltage source, said device being designed to make it possible to adjust an electrical and/or magnetic and/or mechanical value of the current source (2), a so-called control value, and wherein it comprises:
a clock (7) with a period T capable of generating synchronization times t(i),
a computing module (4) capable of computing, at each instant t(i):
from at least one measured value representing the state of the current source (2), at least one control value c(t) and its derivative $\dot{c}(t)$,
from each control value c(t) and its derivative $\dot{c}(t)$, and by comparison with a preselected reference value, the configuration of the static converter (1) capable of leading to the minimization of the difference at the instant t(i)+T between each control value and the corresponding reference value,
the variation of the derivative of one of the control values, the so-called preferred value, between the configurations of the static converter at the instant t(i) and t(i)+T respectively,
a unit (5) for computing the switching instant t(i)+tcom between t(i) and t(i)+T able to minimize the difference at the instant t(i)+T between the preferred control value and the associated reference value,
and a unit (6) for controlling the switching of the static converter at the instant t(i)+tcom.

9. Device as claimed in claim 8 for controlling an N-level inverter (1), with N≧2, associated with a triphase asynchronous machine (2), wherein the computing module (4) includes:
a module (4a) for estimating the values to be controlled of the torque Cem and flux $\phi$s and their derivatives $\dot{C}$em and $\dot{\phi}$s,
a computing module (4b) for determining the configuration of the inverter (1) at an instant t(1)+T as a function of its configuration at the instant T(i), associated with a truth table,
and a module (4c) for predicting the variation of the derivative of the torque $\Delta\dot{C}$em between the configurations at the instants t(i) and t(i)+T.

10. The device as claimed in claim 9, wherein the truth table associated with the computing unit (4b) is as follows:

| Sign ($\Delta\dot{C}$em) | + | − | + | − |
|---|---|---|---|---|
| Sign ($\Delta\dot{\phi}$s) | + | + | − | − |
| θ (1) | P2 | P6 | P3 | P5 |
| θ (2) | P3 | P1 | P4 | P6 |
| θ (3) | P4 | P2 | P5 | P1 |
| θ (4) | P5 | P3 | P6 | P2 |
| θ (5) | P6 | P4 | P1 | P3 |
| θ (6) | P1 | P5 | P2 | P4. |

* * * * *